Dec. 11, 1951     A. DANIELSON     2,578,289
FISHHOOK REMOVER
Filed Jan. 22, 1949
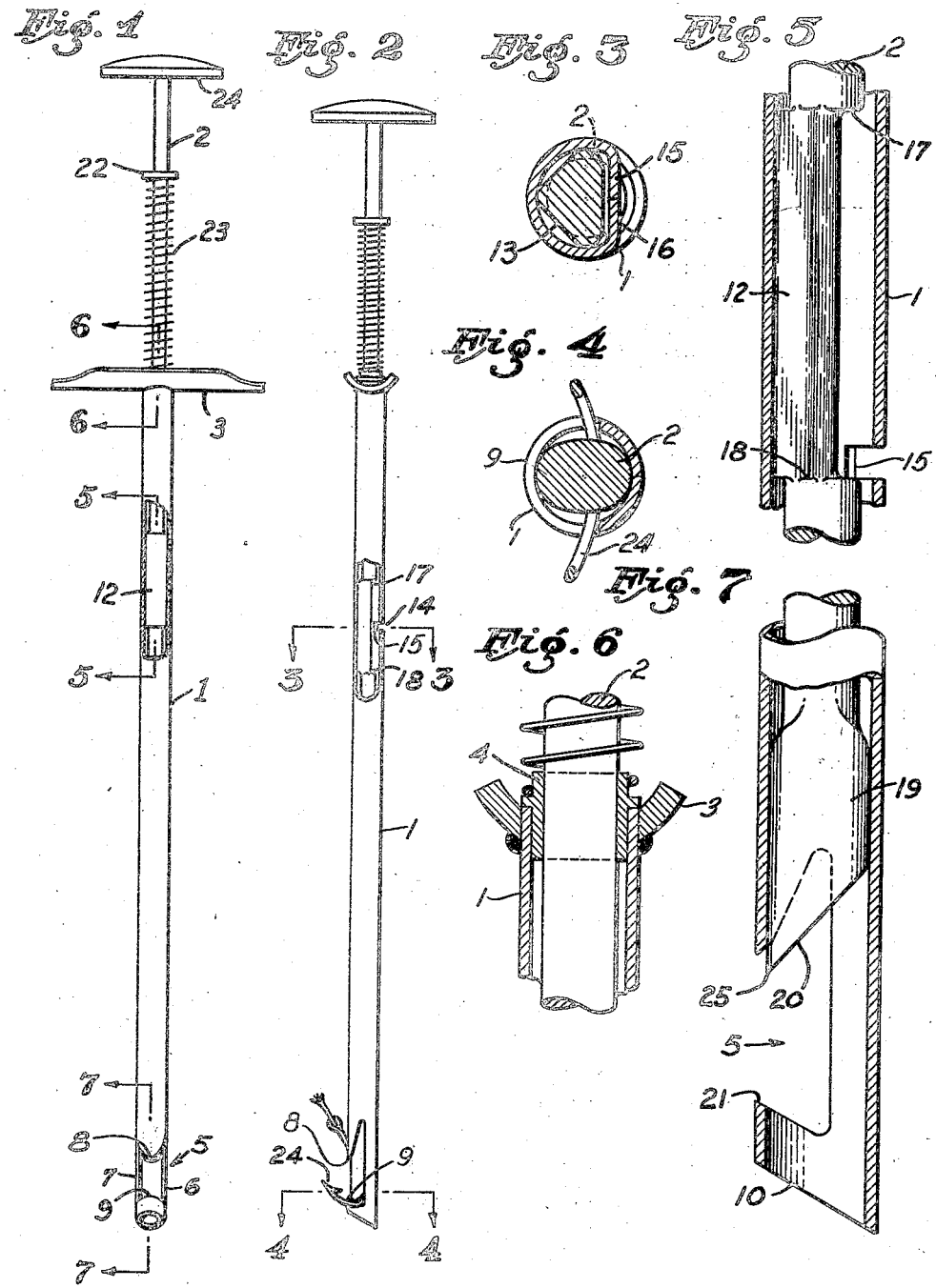
Inventor
ALBERT DANIELSON
By
Attorney

UNITED STATES PATENT OFFICE 2,578,289

FISHHOOK REMOVER

Albert Danielson, South Gate, Calif.

Application January 22, 1949, Serial No. 72,146

5 Claims. (Cl. 43—53.5)

The present invention relates to fish hook removers of the type which allows the fisherman to positively engage the fish hook for the purpose of removing the hook from the fish.

An object of the invention is the provision of a fish hook remover wherein the fish hook is held in such a manner that the hook cannot twist, but may be manipulated in accordance with the desires of the fisherman. With reference to this object, the device of the invention is so constructed that after the fish hook is engaged, the hook may be twisted or turned in any direction desired, so as to release the same from the fish.

A further object is the provision of a fish hook remover which is inexpensive in cost of manufacture, positive in operation, and generally superior to devices of the character stated, now known to the inventor.

In the drawing:

Figure 1 is a fragmentary partially sectional elevation of the fish hook remover of the invention;

Figure 2 is a fragmentary elevation of the device of the invention shown in Figure 1, and revolved 90° from said figure;

Figure 3 is a sectional view on the line 3—3 of Figure 2, and on an enlarged scale;

Figure 4 is a sectional view on the line 4—4 of Figure 2, and on an enlarged scale;

Figure 5 is a fragmentary sectional view on line 5—5 of Figure 1, and on an enlarged scale, the stem not being sectioned;

Figure 6 is a fragmentary sectional view on line 6—6 on Figure 1, and on an enlarged scale, the stem not being sectional; and Figure 7 is a sectional view on line 7—7 of Figure 1, and on an enlarged scale, the stem not being sectioned.

Referring now to the drawing, the improved fish hook remover includes an elongated tube 1 within which is a stem 2, this stem normally projecting beyond one end of the tube, as shown. The tube at its upper end carries a transverse handle 3. A bushing 4 has sliding engagement upon the stem 2 and is secured to the tube 1, as best shown in Figure 6. The lower end of the tube is slotted at 5. This slot is substantially of trapezoidal form, as shown in Figure 7, which is to say, the tube has two portions at 6 and 7 which lie in the same plane, while the portions at 8 and 9 are in undercut angular relationship.

The tube bottom 10 has an inclined face, as shown in Figures 7 and 11. It will be seen that the slot 5 is inward from the bottom tube portion 10. The stem is substantially uniform in diameter throughout its length, save and except for a portion at 12, which is offset relative to the axis of the stem and is substantially triangular in cross section, as shown at 13. (See Fig. 3.)

The tube 1 is slotted at 14 with portions of the tube pressed inwardly at 15 and 16 so as to lie adjacent one face of the triangular section. The portions 15 and 16 limit movement of the stem in two directions within the tube 1, by the portions 15 and 16 engaging the shoulders 17 or 18 depending upon the direction of movement of the stem. These shoulders are formed by offsetting the portion 12.

The lower end 19 of the stem is substantially oval in cross section (see Figure 4) and terminates in edge 20. This edge is inclined downwardly, as shown in Figure 7, so as to cooperate with the upwardly inclined edge 21 bounding the slot 5 in the tube. Surrounding the stem and positioned between a stop 22 and the handle 3, is a coil spring 23. The uppermost end of the stem is provided with a button 24.

The operation, uses and advantages of the invention are as follows:

The normal position for the stem 2 is that shown in Figure 1 and the coil spring 23 urges the stem upwardly so that the end 19 is within the confines of the tube 1. In this position the portions 15 and 16 will contact the shoulder 18 of the stem. When the fisherman desires to remove a fish, the button 24 may be palmed while the fingers grasp the wings of the handle 3 to compress the spring 23 and move the stem 2, as shown for instance in Figure 2. This manipulation will cause a fish hook, such as shown at 24, to be engaged between the inclined end 20 of the stem and the inclined wall 21 of the tube. As the end 20 moves downwardly, it is evident that the portion 25 will be received within the portion 10 of the tube. A locked relationship will, therefore, exist between the stem and the tube which assures that the fish hook will be grasped very tightly by a so-called "wedging" action. Such action will hold the hook very firmly and not permit it to turn during the removal of the hook from the fish. Initially, the fisherman may engage the fish line within the slot of the tube until such time as the hook is reached. When the hook is reached, the operator moves the stem within the tube so as to cause the two inclined faces 20 and 21 to approach. This device will operate on any type of hook.

I claim:

1. A fish hook remover including an elongated tube and a stem for movement in said tube, said tube, inward from one end thereof being formed with a side slot and with upper and lower undercut portions in the zone of said slot and the said stem having an end edge at an angle to the lowermost undercut portion.

2. A fish hook remover including a tube provided with a side slot positioned inwardly from one end of said tube and a stem for movement within the tube provided with an inclined end edge, said tube being provided with upper and lower undercut portions in angular relationship in the zone of said slot and said stem being movable within the tube to progressively vary the area included between the inclined end edge of the stem and the lower undercut portion of the tube.

3. A fish hook remover including a tube, a stem within said tube and projecting beyond one end thereof and a coil spring surrounding the stem and normally urging the stem outwardly of the tube, said tube being formed inwardly from one end thereof with a side slot having upper and lower undercut portions, and said stem being provided with an inclined edge adapted to cooperate with the lowermost undercut portion to wedge therebetween an object positioned within said slot.

4. A fish hook remover including a tube and a stem within said tube, said tube being formed inwardly from one end thereof with a side slot having upper and lower undercut portions, and said stem being provided with an inclined edge adapted to cooperate with the lowermost undercut portion to wedge therebetween an object positioned within said slot.

5. A fish hook remover including a tube provided near one end thereof with a side entrance slot with its ends diverging inwardly from its entrance, and a stem for movement in said tube relative to said slot with the adjacent end of said stem and the outer end of said slot diverging inwardly for gripping a fish hook therebetween when said end of said stem is moved toward said outer end of said slot.

ALBERT DANIELSON.

REFERENCES CITED

The following references are of record in the file of this patent:

UNITED STATES PATENTS

| Number | Name | Date |
|---|---|---|
| 1,539,221 | Tennant | May 26, 1925 |
| 1,631,510 | Barrett | June 7, 1927 |
| 1,652,944 | Kelly | Dec. 13, 1927 |
| 1,785,870 | Marles | Dec. 23, 1930 |
| 2,121,682 | Boucher | June 21, 1938 |
| 2,512,818 | Wikarski | June 27, 1950 |